UNITED STATES PATENT OFFICE.

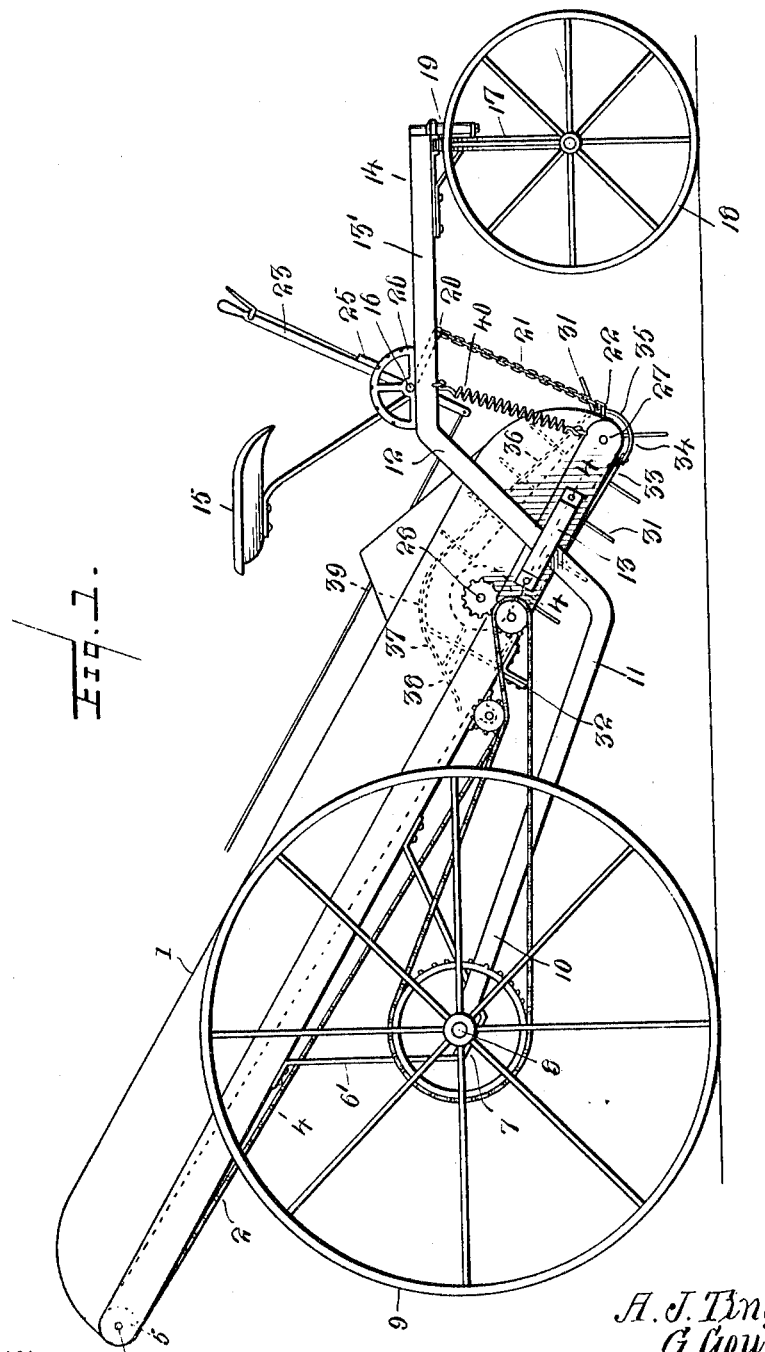

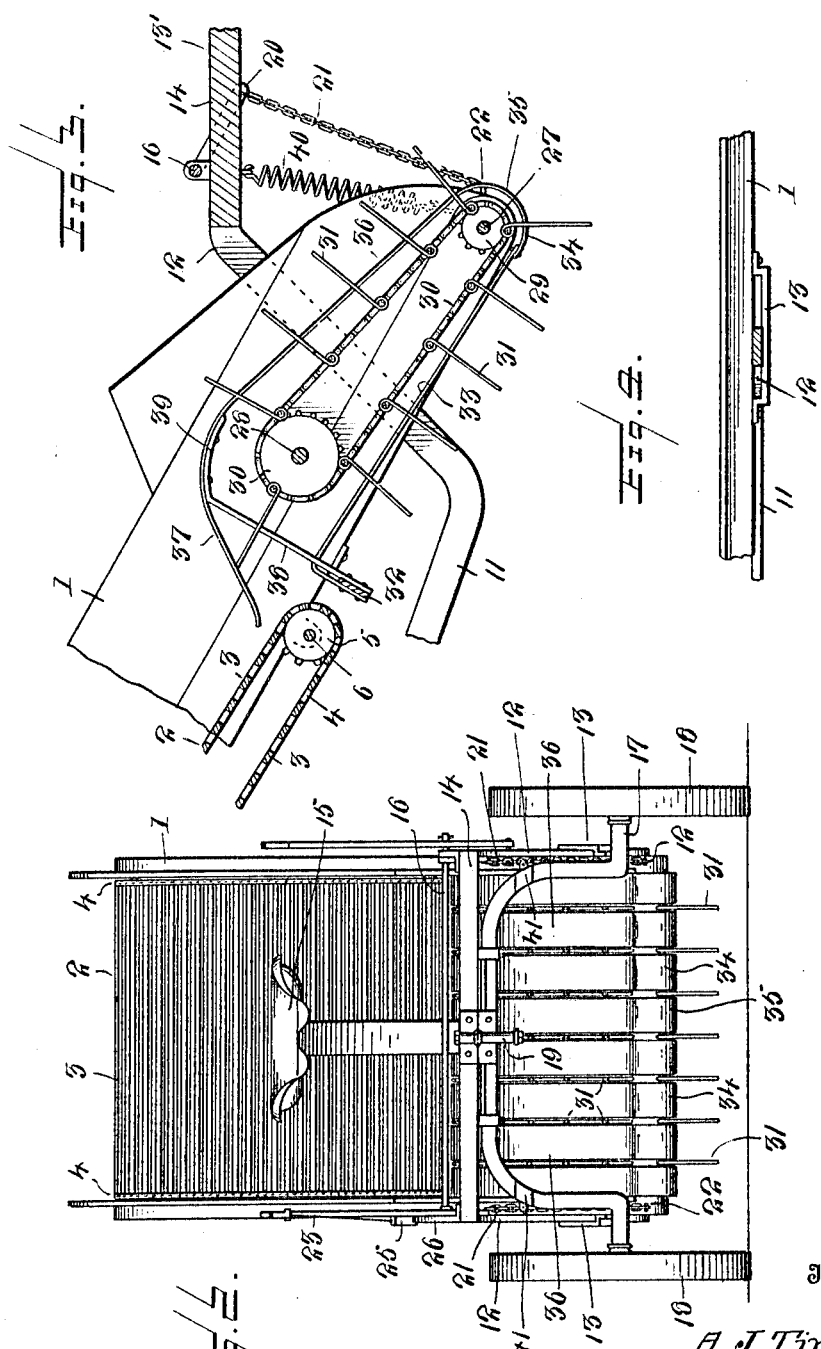

GLENN GOULD AND ALLEN J. TINGLEY, OF OWOSSO, MICHIGAN.

COLLECTING AND STRIPPING MECHANISM.

1,119,422.        Specification of Letters Patent.        Patented Dec. 1, 1914.

Application filed January 17, 1913. Serial No. 742,645.

*To all whom it may concern:*

Be it known that we, GLENN GOULD and ALLEN J. TINGLEY, citizens of the United State of America, residing at Owosso, in the county of Shiawasse and State of Michigan, have invented certain new and useful Improvements in Collecting and Stripping Mechanism, of which the following is a specification.

This invention relates to collecting and stripping mechanism for bean bunching and windrowing apparatus; and it has for its object the provision of mechanism which will be located at the effective collecting end of the machine and associated with picking and collecting means so as to permit the release of the collecting mechanism from the material on the discharge of the latter to the conveying means of the machine.

Another object of the invention is the provision of portable draft frame which will support the carrier in such manner as to permit the latter to yield vertically under the resisting action of obstructions which are disposed in the path of travel of the machine.

Another object of the invention is the provision of mechanism which will facilitate adjusting the collecting end of the machine with relation to the ground.

A further object of the invention is the provision of means for guiding the collecting tines or elements of the collecting mechanism in their movement toward and from the main carrier.

A still further object of the invention is the provision of a collector wherein the collecting elements or tines will be yieldable so as to prevent injury thereto on their sudden thrust against the ground or against obstructions.

Another object of the invention is the provision of a draft frame which may be connected either directly with a suitable form of farm implement so as to follow directly therebehind or connected directly with a suitable form of draft attachment to which the draft animals may be attached.

With these and other objects in view, the invention consists of certain novel features of construction, combination and arrangement of parts, as will be hereinafter described and claimed.

In the accompanying drawings:—Figure 1 is a side elevation of a portion of a windrowing and bunching machine, showing the application of the stripping mechanism thereto; Fig. 2 is a front view thereof; Fig. 3 is a section on an enlarged scale through the stripping mechanism; Fig. 4 is a section on the line 4—4 of Fig. 1.

With a view to providing mechanism wherein the material will be positively stripped or disengaged from the collecting forks on the gradual approach of the forks toward the main carrier and for positively preventing the material from returning with the forks on movements of the latter in the direction of the effective collecting end of the machine, we have provided the frame 1 with a main carrier, said frame having an endless carrier 2, consisting of spaced slats 3, which are connected in any suitable well known manner in the links of sprocket chains 4. These chains are connected with sprocket gears 5 on shafts 6 in the frame 1. They may be driven in any suitable well known manner so as to cause the material as it is discharged from the collecting mechanism to be conveyed to a suitable receiving point for subsequent discharge onto the field laterally of the path of travel of the machine. The frame of the main carrier is provided in its length with depending brackets 6′ having bearings 7 which receive the axle 8 of main large supporting wheels 9. This axle also receives the rear ends 10 of the side bars 11 of a draft frame. The bars 11 are extended downwardly and forwardly from the axle 8 to a point slightly within the plane of the forward end of the carrier frame and they are then extended upwardly and forwardly, as at 12 and through guides 13 on the side bars of the carrier frame whereby to permit the latter to be tilted vertically for a purpose to be hereinafter explained. From the portions 12 the side bars are extended forwardly in a horizontal plane, as shown at 13′, and they have connected therewith a suitable operator's platform 14, on which may be mounted a driver's seat 15 and a rocking controlling shaft 16. The front axle 17 is substantially of inverted U-form, being provided with small wheels 18, and as illustrated said axle is operatively connected at 19 with the front of the draft frame so that the wheels will accommodate themselves to the proper steering movements of the axle, a sufficient space being formed between the front wheels 18 and the front of the main carrier frame 1, so as to permit the wheels to turn without said carrier frame forming an obstruction thereto.

The controlling shaft 16 is provided with a rigid arm 20 to which is adjustably connected one end of a chain 21, the opposite end of the chain having connection at 22 with the front end of the main tilting carrier frame 1. The controlling shaft is also provided with an actuating lever 23, which is located relatively of the seat 15, whereby it can be conveniently grasped by the operator and adjusted. A pawl 25 of the lever may be engaged with the teeth of a quadrant or rack member 26 of the operator's platform to thereby retain prescribed adjustments of the forward end of the carrier frame.

The carrier frame 1 is extended some distance beyond the front of the carrier 2, and as illustrated the side bars of the carrier frame support shafts 27 and 28 having sprocket wheels 29 thereon over which pass the collecting chains 30. These chains are provided with yieldable forks or tines 31, which are preferably arranged equidistantly in the length of the chains and adapted to be projected in successive order below the forward end of the carrier frame 1, so as to positively engage and collect the material. The tines 31 are arranged in longitudinal rows through the width of the carrier frame 1.

The stripping mechanism comprises a supporting bar 32 which is fixed to the main carrier frame 1 and as illustrated, said bar is provided with forwardly-extending portions 33, which lie below the plane of the chains 30 and which are disposed between adjacent rows of tines 31. At the forward ends, the plates 33 are connected with other plates 34, the latter being curved upwardly at their forward ends, as at 35, and then rearwardly and upwardly, as at 36, and disposed at an angle to the upper leads of the chains 31 or in rearwardly diverging relation thereto. The rear ends of the plates are then extended downwardly, as at 37, to provide chutes or distributing portions which directly overlie the forward end of the carrier 2, so as to effectually permit the material to be discharged onto the carrier. Brackets 38 are extended from the bar 32 and connected at 39 with the portions 37 of the stripping elements, so as to brace the latter and retain definite positions of the same relatively of the tines 31. A spring 40 connects the draft frame with the carrier frame 1 and is adapted to yieldingly support the forward end thereof and permit the collecting mechanism to clearly pass obstructions which may lie in the direct path of travel of the machine.

From the peculiar construction of the stripping mechanism, it is evident that the substantially superimposed plates thereof define guides for the respective rows of collecting tines 31, so as to retain the tines in proper position with respect to the plates. By arranging the portions 36 in upwardly and rearwardly diverging relation with the upper leads of the chains 30, it is evident that the tines will be gradually drawn below the plane of the portions 36 in their movements toward the collector 2, so that the material during its course of discharge onto the carrier will be gradually removed from the tines. The portions 37 are extended for such distances from the tines that the latter leave the former as the tines tend to return to their initial collecting positions. As a consequence of this arrangement it will entirely eliminate returning the material to the ground or removing the same from the carrier 2 after the material is deposited onto the latter. The gradual withdrawal or extraction of the material from the tines minimizes the friction between the respective parts during the stripping operation and as a result the parts may be operated with very little power.

The front axle 17 is provided with suitable clips 41, to which a draft pole (not shown) may be connected so that the machine may be propelled across the field by draft animals, if desired. The bar 32 and the distributing or chute forming portion 37 of the stripping means are spaced from the main carrier 2, so as to permit foreign particles or dirt to be deposited back to the ground during the operation of discharging the material onto the carrier. By constructing the carrier of spaced flaps, it is obvious that the same is rendered substantially foraminous whereby to permit loose particles of dirt or foreign matter to fall through the carrier when delivering the material to its receiving designation.

Having thus described our invention, what we claim is:

1. In a machine of the character described, a wheeled draft frame embodying vertically inclined portions, a vertically swinging inclined conveyer frame extending above the draft frame with the lower end thereof disposed adjacent the vertically inclined portions of the draft frame, guide elements secured to the lower end of the inclined conveyer frame and slidably engaging the said inclined portions, means connected with the draft frame to raise and lower the lower end of the inclined conveyer-frame, a conveyer belt arranged within the conveyer frame, and collecting mechanism arranged within the lower end of the inclined conveyer frame in proximity to the take-up end of the conveyer belt.

2. In a machine of the character described, a wheeled draft frame embodying vertically inclined portions, a vertically swinging inclined conveyer frame arranged above the draft frame with the lower end thereof disposed adjacent the vertically inclined portions of the draft frame, guide brackets secured to the lower end of the inclined conveyer frame and slidably engaging said vertically inclined portions, a coil spring connecting the lower end of the inclined conveyer frame with the draft frame to yieldingly support the former, means connected with the draft frame to raise and lower the lower end of the inclined conveyer frame, a conveyer belt arranged within the inclined conveyer frame and terminating at a point spaced a substantial distance from the lower end of the conveyer frame, collector mechanism arranged within the lower end of the inclined conveyer frame and spaced a substantial distance from the take-up end of the conveyer belt, and means arranged above the collector mechanism to remove the material therefrom.

In testimony whereof we affix our signatures in presence of two witnesses.

GLENN GOULD.
ALLEN J. TINGLEY.

Witnesses:
AUG. STEPHAN,
SETH NUNELL.

Copies of this patent may be obtained for five cents each, by addressing the "Commissioner of Patents, Washington, D. C."